Sept. 15, 1970
C. C. HACH
3,528,750
RADIATION SENSITIVE DUAL BEAM TURBIDIMETER
Filed Jan. 28, 1969
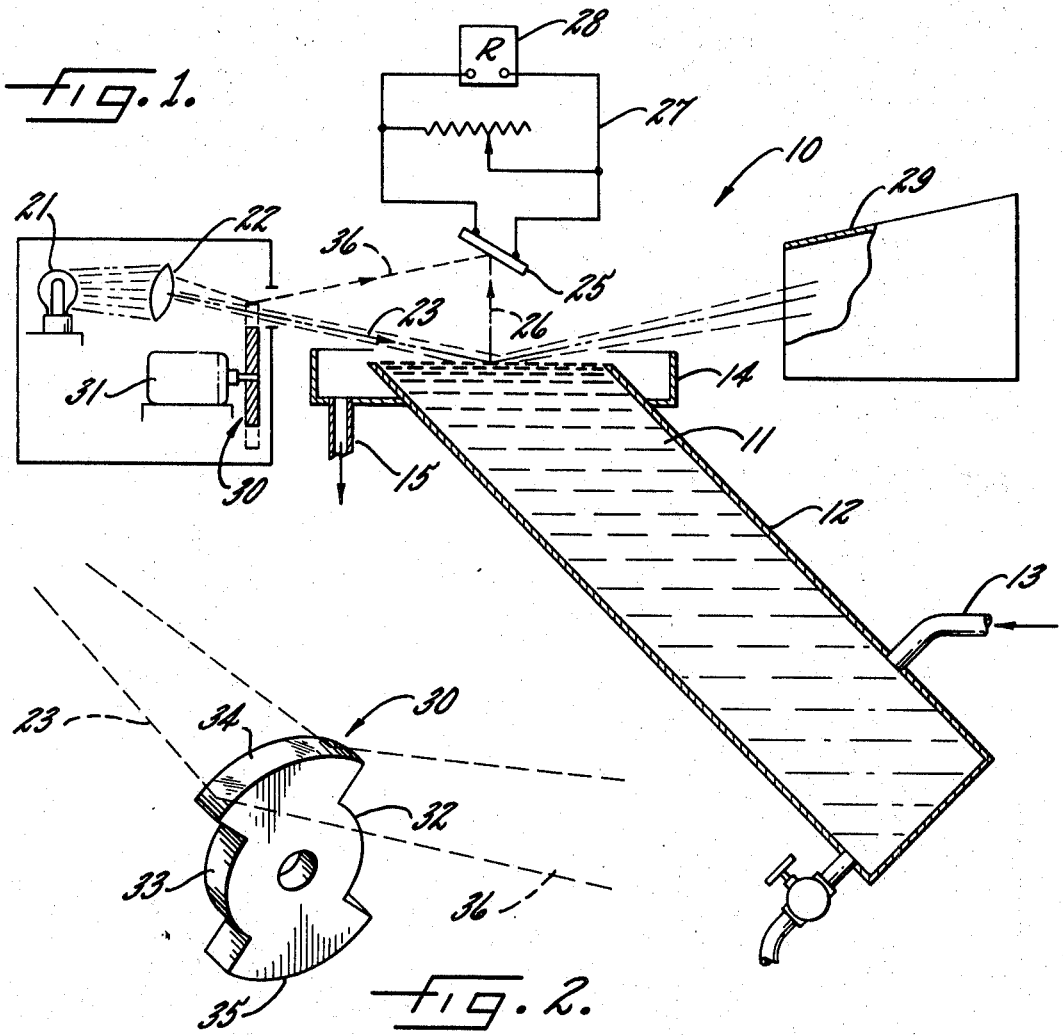
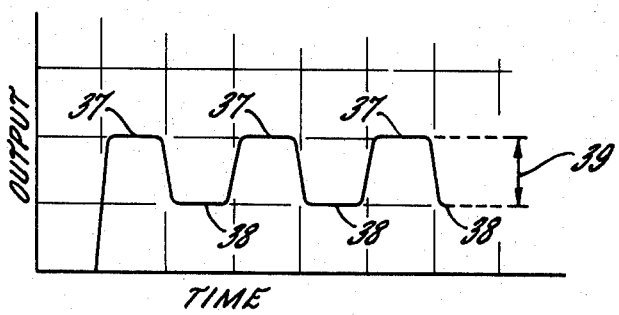
INVENTOR.
CLIFFORD C. HACH,
BY
Wolf, Hubbard, Voit & Osann
ATTORNEYS.

United States Patent Office 3,528,750
Patented Sept. 15, 1970

3,528,750
RADIATION SENSITIVE DUAL BEAM
TURBIDIMETER
Clifford C. Hach, Ames, Iowa, assignor to Hach Chemical Company, a corporation of Delaware
Filed Jan. 28, 1969, Ser. No. 794,730
Int. Cl. G01n 21/26
U.S. Cl. 356—208                                            3 Claims

ABSTRACT OF THE DISCLOSURE

A turbidimeter in which light is alternately directed to the sample and directly to the photocell which is reading the turbidity-affected light output from the sample. Two photocell reading levels are thus obtained, one resulting from light falling directly on the photocell and the other responsive to the amount of turbidity. The difference in these reading levels is a measure of turbidity that is independent of variations in light output.

DESCRIPTION OF THE INVENTION

This invention relates generally to instruments for measuring the turbidity of a fluid and more particularly concerns such instruments which employ light as the turbidity measuring mechanism.

Fluid turbidity can be accurately sensed by passing a light beam into a sample of the fluid and employing a photocell to measure either the amount of light allowed to pass through the fluid or the amount of light reflected from the particles in the fluid. In the first case, a "full scale" reading indicates no turbidity and, in the second case, a zero reading means no turbidity. However, in either case, any "on scale" reading can be affected by variations at the light source, in the light path, or in photocell light sensitivity.

In other words, a gradually dimming light bulb can produce an erroneous turbidity reading, as can a variation in the voltage that excites the light bulb. Similarly, dirt or some other deposit on the lenses or windows in the light path can also alter turbidity readings with no actual change in the turbidity of the sample. So also, a loss of photocell sensitivity can cause incorrect instrument readings. Such instrument induced errors are often referred to as instrument "drift."

It is the primary aim of the invention to provide a turbidimeter that is substantially free of instrument drift.

Another object of the invention is to provide a turbidimeter 10 embodying the invention and intended to reliable and inexpensive mechanism for avoiding instrument drift by developing an output signal that is unaffected by most causes of drift.

Other objects and advantages of the invention will be apparent upon reading the following detailed description and upon reference to the drawings, in which:

FIG. 1 is a partially schematic elevation of a turbidimeter embodying the invention;

FIG. 2 is a fragmentary perspective of a portion of the mechanism as shown in FIG. 1; and FIG. 3 is a graphic representation of a typical signal developed by the instrument shown in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention.

Turning now to the drawing, there is shown a turbidimeter 10 embodying the invention and intended to measure the turbidity in a flowing fluid sample 11. The sample 11 is held in an inclined, elongated container 12 having a fluid inlet 13 and a trough 14 surrounding the open container top. In operation, fluid is continuously introduced through the inlet 13. The fluid overflows the container 12, spilling over into the trough 14 from which the fluid is discharged through a drain 15.

To measure turbidity, a light source comprising a bulb 21 and a lens 22 directs a light beam 23 into the fluid sample, and a light sensor 25 is positioned to receive light from the sample with the amount of light so received varying with the amount of turbidity in the sample. The turbidimeter 10 is a reflecting type instrument, or nephelometer, and hence the sensor 25 receives light reflected from turbidity particles at or near the surface of the sample 11. The amount of light detected by the sensor, coming from the sample along a light path 26, is dependent upon the amount of turbidity in the sample and, for convenience in reading, the sensor 25 is coupled by a circuit 27 to a suitable recorder 28. Light refracted into the sample is dissipated down the length of the container 12, and light reflected from the sample surface is caught in a light trap 29.

In accordance with the invention, light is diverted intermittently from the sample 11 directly to the light sensor 25 so that turbidity is indicated by the resulting differences in the light sensor outputs. In the illustrated instrument, the light beam 23 is diverted by a butterfly disc 30 rotatably driven in the path of the beam 23 by a synchronous motor 31. The disc 30 is formed with a pair of peripheral notches 32 and 33 spaced by adjacent reflecting surfaces 34 and 35. Preferably, there are two notches 32, 33 and two reflecting surfaces 34, 35, each occupying ¼ of the periphery of the disc 30.

As the disc 30 rotates, the notches 32, 33 allow the beam of light 23 to reach the fluid sample surface. However, those portions of the disc bearing the surfaces 34, 35 block the light beam 23 from the sample and reflect the light along a path 36 directly to the sensor 25. Therefore, as the disc 30 rotates, the sensor alternately receives light along the path 36 directly from the light source, and then along the path 26 from the turbidity particles in the fluid sample.

Expressed graphically (see FIG. 3), the light reflected from the surfaces 34, 35 causes peak output signals 37 to be generated by the sensor 25, whereas lower signals 38 will result from the lesser amount of light reflected by turbidity particles. However, an accurate turbidity reading will be the difference 39 between the signals 37, 38. This difference will be unaffected by variations in light source output, as might be caused by lamp voltage changes, a fogging lens system, etc. Any such variations in the light source or in the light paths will change both signals 37, 38 uniformly, leaving the difference 39 a constant and accurate indication of turbidity.

By driving the disc with a synchronous motor, and keeping the peripheral length of the notches 32, 33 and the reflecting surfaces 34, 35 equal, the sensor 25 receives light through alternate but equal time intervals from the sample and the reflecting surfaces. This makes it somewhat easier to maintain a reliable comparison between the two levels of output signals.

While the turbidimeter 10 is of the nephelometer type, it will be plain that the invention can also be utilized with absorption types of turbidimeters.

I claim as my invention:

1. A turbidimeter comprising, in combination, a container for holding the fluid sample, a light source positioned to direct a beam of light into a fluid sample in said container, a light sensor positioned to receive light from said fluid sample with the amount of light so received varying with the amount of turbidity in the sample, means for intermittently diverting said beam of light from said sample directly to said light sensor, and a device coupled to said sensor for indicating the amount of light received by the sensor, whereby the amount of turbidity is indicated by the difference in the indications of said device.

2. The combination of claim 1 in which said means includes a uniformly rotated disc having a notch in its periphery, said notch passing through said beam of light as the disc rotates so as to allow said beam to reach the fluid sample, said disc having a reflecting surface adjacent said notch for reflecting and thus diverting said beam to said light sensor.

3. The combination of claim 2 in which the peripheral length of said notch is equal to the peripheral length of said reflecting surface, and the combination including a synchronous motor for rotating said disc so that said sensor receives light through alternate but equal time intervals from said sample and said surface.

References Cited

UNITED STATES PATENTS

| | | | |
|---|---|---|---|
| 2,621,808 | 12/1952 | Blakeney | 250—233 X |
| 2,874,606 | 2/1959 | Leiterer | 356—104 |
| 2,978,589 | 4/1961 | Howell | 250—233 X |
| 3,060,318 | 10/1962 | Ouvrard | 356—208 X |
| 3,366,795 | 1/1968 | Ravitsky et al. | 250—233 X |

WALTER STOLWEIN, Primary Examiner

U.S. Cl. X.R.

250—218, 233